United States Patent
Shen et al.

(10) Patent No.: US 8,045,324 B2
(45) Date of Patent: Oct. 25, 2011

(54) CABLE BOX AND PERSONAL COMPUTER HAVING SAME

(75) Inventors: Yu-Cheng Shen, Taipei (TW); Chin-Nan Lai, Taipei (TW); Chun-Chieh Yen, Taipei (TW); Chuan-Chang Chou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 160 days.

(21) Appl. No.: 12/477,484

(22) Filed: Jun. 3, 2009

(65) Prior Publication Data

US 2009/0303672 A1 Dec. 10, 2009

(30) Foreign Application Priority Data

Jun. 6, 2008 (TW) ................................ 97121261 A

(51) Int. Cl.
*G06F 1/16* (2006.01)
(52) U.S. Cl. ................ 361/679.02; 361/679.6; 361/724; 429/501; 429/502
(58) Field of Classification Search .................... 361/641
See application file for complete search history.

(56) References Cited

U.S. PATENT DOCUMENTS

| | | | | |
|---|---|---|---|---|
| 4,944,694 A * | 7/1990 | Dorn | ............................. | 439/501 |
| 5,136,468 A * | 8/1992 | Wong et al. | ................ | 361/679.6 |
| 5,567,180 A * | 10/1996 | Seo | ................................ | 439/638 |
| 5,650,910 A * | 7/1997 | Winick et al. | ............... | 361/679.6 |
| 5,761,029 A * | 6/1998 | Jay | ........................... | 361/679.33 |
| 6,109,958 A * | 8/2000 | Ke | .................................. | 439/535 |
| 6,122,173 A * | 9/2000 | Felcman et al. | .............. | 361/726 |
| 6,219,235 B1 * | 4/2001 | Diaz et al. | ..................... | 361/695 |
| 6,304,437 B1 * | 10/2001 | Foo et al. | .................... | 361/679.6 |
| 6,362,421 B1 * | 3/2002 | Layton, Jr. | ..................... | 174/50 |
| 6,406,327 B1 * | 6/2002 | Soon | ............................. | 439/501 |
| 6,780,047 B1 * | 8/2004 | Laity et al. | .................... | 439/501 |
| 7,025,627 B2 * | 4/2006 | Rosenthal et al. | ............ | 439/501 |
| 7,038,126 B2 * | 5/2006 | Solet | ................................ | 174/50 |
| 7,068,516 B2 * | 6/2006 | Chan et al. | .................... | 361/731 |
| 7,351,110 B1 * | 4/2008 | Wu | ............................... | 439/638 |
| 7,411,783 B2 * | 8/2008 | Su | ............................ | 361/679.55 |
| 7,589,957 B2 * | 9/2009 | Capuzza et al. | .............. | 361/641 |
| 7,622,673 B2 * | 11/2009 | Quijano | ........................... | 174/50 |
| 7,719,843 B2 * | 5/2010 | Dunham | ....................... | 361/725 |
| 2004/0007371 A1 | 1/2004 | Chang | | |
| 2004/0104037 A1 * | 6/2004 | Solet | ................................ | 174/50 |
| 2005/0199410 A1 * | 9/2005 | Voon et al. | ................... | 174/65 R |
| 2006/0264094 A1 * | 11/2006 | Young | ............................ | 439/501 |

FOREIGN PATENT DOCUMENTS

| | | |
|---|---|---|
| CN | 2731906 Y | 10/2005 |
| CN | 2798171 Y | 7/2006 |
| TW | 502817 | 4/1990 |

* cited by examiner

*Primary Examiner* — Jinhee Lee
*Assistant Examiner* — Anthony Q Edwards
(74) *Attorney, Agent, or Firm* — Jianq Chyun IP Office

(57) ABSTRACT

A computer includes a computer case, a motherboard, a cable box, a power supply and a peripheral component. The computer case has a first disk drive slot and a second disk drive slot within the inner portion thereof. The cable box is installed in the first disk drive slot. The power supply is connected with the cable box through a power cord. The peripheral component is installed in the second disk drive slot, wherein electricity is transmitted from the power supply to the peripheral component through the cable box.

11 Claims, 4 Drawing Sheets

CABLE BOX AND PERSONAL COMPUTER HAVING SAME

FIELD OF THE INVENTION

The present invention relates to a cable box, and more particularly to a cable box of a personal computer. The cable box is used to manage, store and distribute the power cords of a power supply of the personal computer.

BACKGROUND OF THE INVENTION

With increasing progress and development of electronic industries, multimedia personal computers of high video quality and high audio quality have experienced great growth and are rapidly gaining in popularity. As such, the computer-related products and associated industries are gradually developed.

A computer usually has a rectangular computer case and a plurality of insertion slots within the computer case. Diverse components may be inserted into corresponding insertion slots. Generally, the computer comprises a power supply, a motherboard, a hard disk and various peripheral components. The peripheral components include for example an optical disk drive, a floppy disk drive, a disk burner, a hard disk and the like.

After these components are installed within the computer case, the power cords of the power supply are connected to for example the motherboard, the hard disk and the optical disk drive so as to receive electricity from the power supply. Individual components within the computer case are electrically connected with each other via diverse conducting wires such as IDE cables, SATA cables. Moreover, there are some backup power cords within the computer case. The power cords and conducting wires (collectively referred as cables) within the computer case are usually entangled and messy. As the watts of the power supply is gradually increased and the number of peripheral components is increased, the connection between more cables within the computer case becomes much messier.

Such a messy and disorganized cable arrangement becomes hindrance from flowing air within the computer case. As such, the heat-dissipating efficiency of the fan is decreased. In addition, if the cables get stuck in the CPU fan, the CPU fan may have a breakdown. For solving these drawbacks, the cables are fixed and collected by straps. The use of the strap still results in a messy and disorganized cable arrangement.

The components within the computer case are powered by the electricity offered by the power supply. As known, the plain type power supply usually has three or four power cords to be connected with the peripheral components of the computer. If the number of peripheral components is increased, the power cords are not enough to connect the power supply and the peripheral components. Under this circumstance, the user needs to purchase additional power lines so as to overcome the drawback resulting from insufficient power cords.

FIG. 1 is a schematic perspective view illustrating a power cord arrangement of a modular power supply according to the prior art. FIG. 2 is a schematic perspective view illustrating connection between the modular power supply of FIG. 1 and the components within a computer. As shown in FIG. 1, a plurality of insertion slots are disposed on the housing of the modular power supply. According to the user's requirements, proper power cords are used to connect the power supply and corresponding peripheral components. Under this circumstance, the power cords that are not in use may be detached from the power supply and put away. For mounting more peripheral components within the computer case, the backup power cords may be used to connect the peripheral components and the power supply. As such, the flexibility of arranging the power cords is enhanced. Since the modular power supply is exclusive, purchasing the modular power supply increases extra cost. In addition, the user needs to purchase other related wiring equipment. That is, the use of the modular power supply is not user-friendly.

SUMMARY OF THE INVENTION

In accordance with an aspect of the present invention, there is provided a cable box of a computer. The computer comprising a power supply and a peripheral component. The cable box includes a box body, a circuit board and a plurality of connectors. The box body has an opening. A power cord of the power supply is introduced into the inner portion of the box body through the opening. The circuit board is disposed within the box body and electrically connected with the power cord. The connectors are disposed on a sidewall of the box body and electrically connected to the circuit board through corresponding conducting wires, wherein electricity is transmitted from the power supply to the peripheral component through one of the connectors.

In accordance with another aspect of the present invention, there is provided a computer. The computer includes a computer case, a motherboard, a cable box, a power supply and a peripheral component. The computer case has a first disk drive slot and a second disk drive slot within the inner portion thereof. The cable box is installed in the first disk drive slot. The power supply is connected with the cable box through a power cord. The peripheral component is installed in the second disk drive slot, wherein electricity is transmitted from the power supply to the peripheral component through the cable box.

Since the floppy disk drive is not an essential component of the computer, the cable box of the present invention is installed in the floppy disk drive slot within the computer case. The cable box is electrically connected to the power supply through power cords and electrically connected to corresponding peripheral components through conducting wires.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
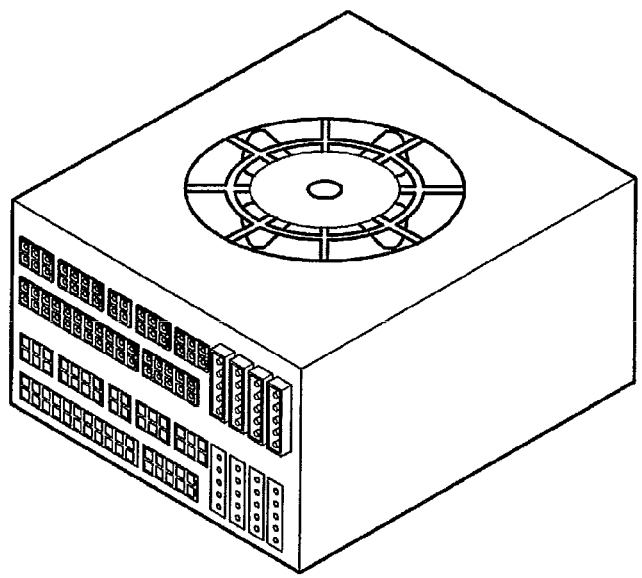
FIG. 1 is a schematic perspective view illustrating a power cord arrangement of a modular power supply according to the prior art.
Figure 2:
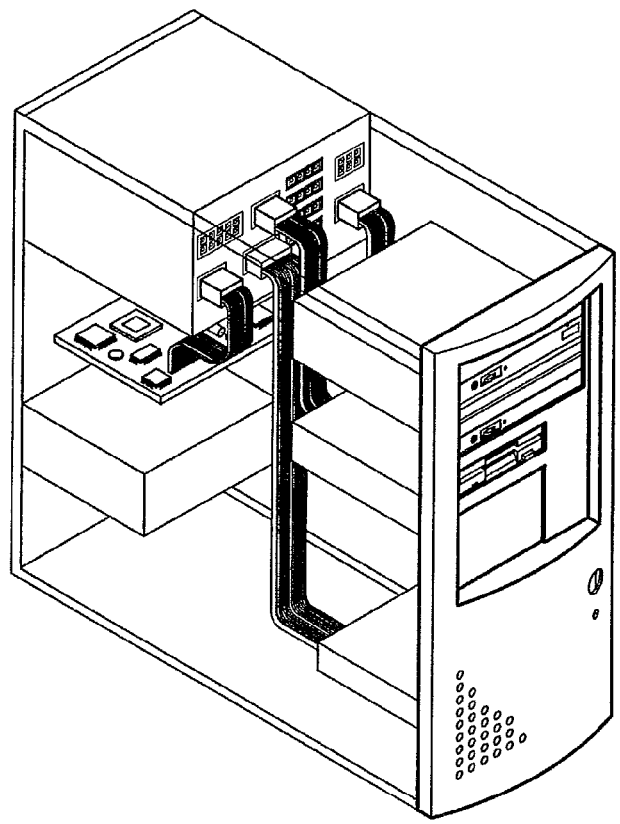
FIG. 2 is a schematic perspective view illustrating connection between the modular power supply of FIG. 1 and the components within a computer.
Figure 3:
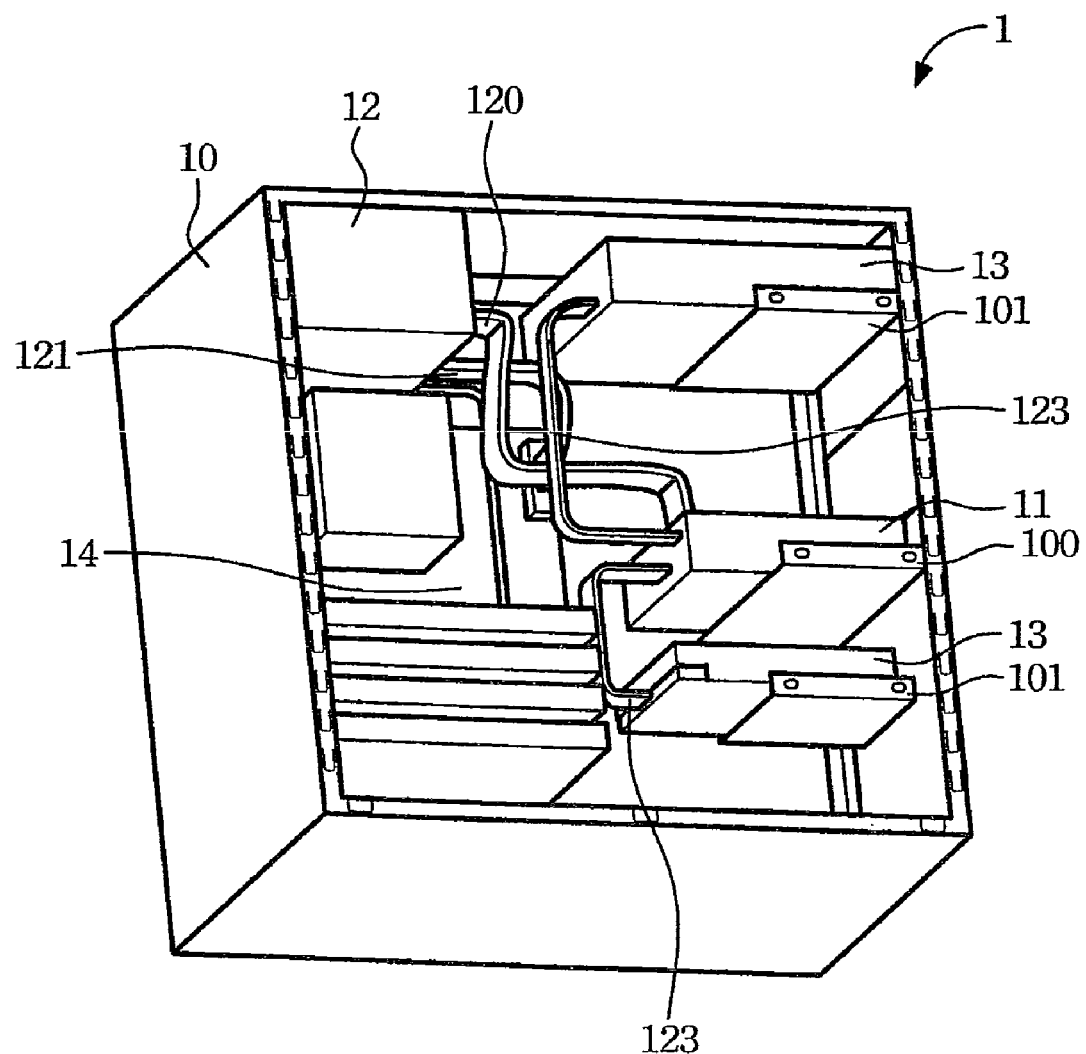
FIG. 3 is a schematic perspective view illustrating a computer having a cable box of the present invention.
Figure 4:
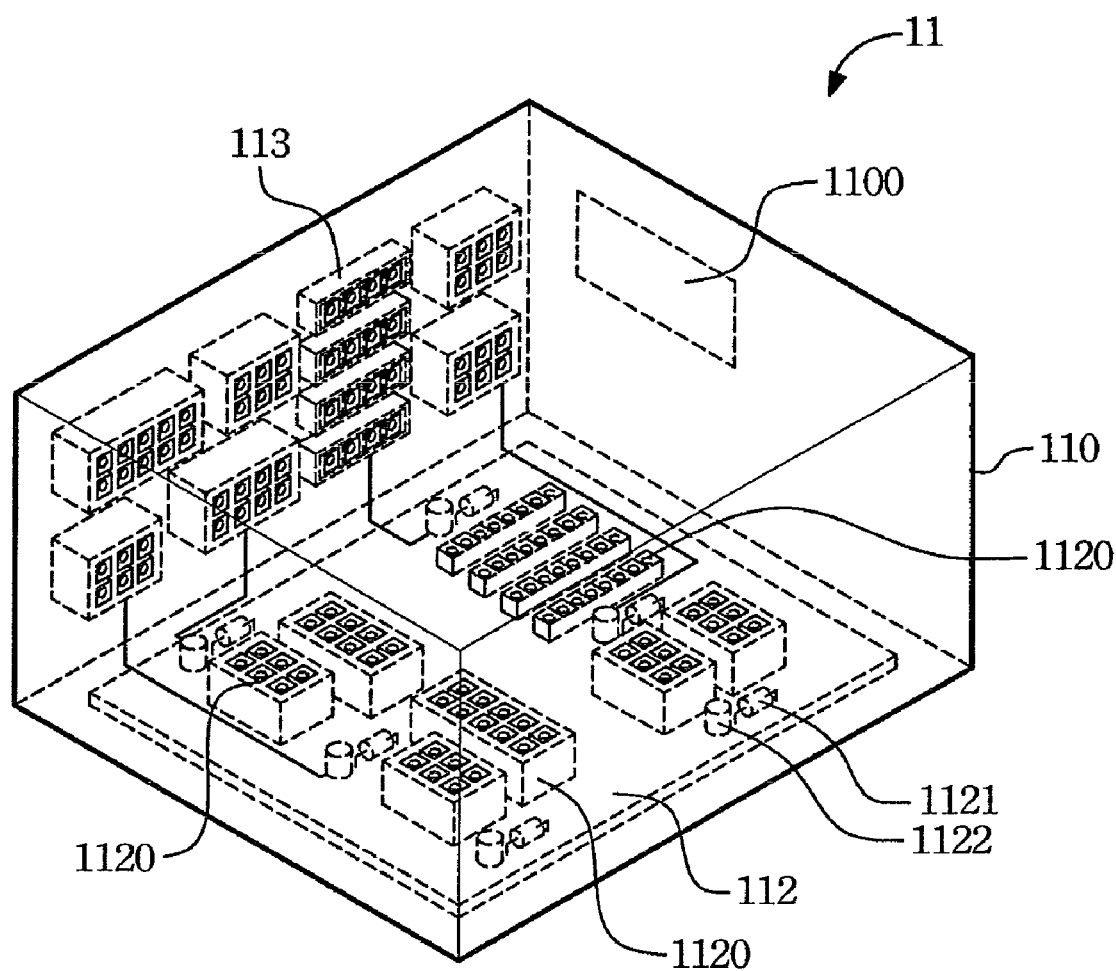
FIG. 4 is a schematic perspective view illustrating the cable box according to an embodiment of the present invention.

FIG. 3 is a schematic perspective view illustrating a computer having a cable box of the present invention. FIG. 4 is a schematic perspective view illustrating the cable box according to an embodiment of the present invention.

As shown in FIG. 3, the computer 1 comprises a computer case 10, a cable box 11, a power supply 12, at least one peripheral component 13 and a motherboard 14. The power supply 12 is mounted within and at the upper and rear side of the computer case 10. The motherboard 14 is mounted within the computer case 10 and disposed under the power supply 12. Moreover, a first disk drive slot 100 and a second disk drive slot 101 at the front side of the computer case 10. In this embodiment, the first disk drive slot 100 is a floppy disk drive slot 100. Originally, the first disk drive slot 100 provides a space for installing a floppy disk. On the other hand, the cable box 11 is installed in the first disk drive slot 100 according to the present invention. The second disk drive slot 101 is for example an optical disk drive slot or a hard disk drive slot for providing a space to install an optical disk drive, a hard disk drive or other peripheral component.

As shown in FIG. 4, the cable box 11 includes a box body 110, a circuit board 112 and a plurality of connectors 113. The box body 110 has an opening 1100. The power cords of the power supply 12 may run through the opening 1100. The circuit board 112 is disposed within the box body 110. In addition, a plurality of sets of insertion slots 1120 are mounted on the circuit board 112. After the cable connectors at the front ends of the power cords of the power supply 12 are inserted into corresponding insertion slots 1120, the circuit board 112 is electrically connected with the power supply 12. The insertion slots 1120 are selected from any PC connectors. In addition, for stabilizing voltage and filtering off noise of each insertion slot 1120, a capacitor 1121 and an inductor 1122 are mounted on the circuit board 112 and electrically connected to each set of insertion slot 1120. Moreover, the connectors 113 are disposed on a sidewall of the box body 110. These connectors 113 are electrically connected to the circuit board 112 through conducting wires. After the power cords of the peripheral components of the computer 1 are connected to corresponding connectors 113, electricity will be transmitted from the power supply 12 to the peripheral components through the circuit board 112 and the connectors 113.

Please refer to FIG. 4 again. The opening 1100 is disposed in another sidewall of the box body 110. That is, the opening 1100 and the connectors 113 are disposed on different sidewalls of the box body 110.

Recently, the functions of the floppy disk drive are gradually replaced by a portable hard disk or other storage medium. That is, the floppy disk drive is not an essential component. If the computer contains no floppy disk drive, the floppy disk drive slot is empty. In this embodiment, the size of the cable box 11 is substantially identical to the size of the common floppy disk drive. As a consequence, the cable box 11 is installed in the first disk drive slot 100 and the first disk drive slot 100 is a floppy disk drive slot. Since the cable box 11 is installed in the floppy disk drive slot, no additional space is required to store the cable box 11. Under this circumstance, the space utilization in the computer case 10 is enhanced.

The peripheral component 13 that is installed in the second disk drive slot 101 includes for example a hard disk, an optical disk drive or a disk burner.

The power cords of the power supply 12 include power cords 120 and 121. Through the power cords 120, electricity is transmitted from the power supply 12 to the peripheral component 13. Through the power cords 121, electricity is transmitted from the power supply 12 to the motherboard 14. In this embodiment, the power cords 121 may be inserted into corresponding insertion slots on the motherboard 14, so that the electricity is transmitted from the power supply 12 to the motherboard 14. The power cords 120 may be introduced into the inner portion of the box body 11 through the opening 1100 and then electrically connected with the connectors 13 through the circuit board 112. As a consequence, electricity is transmitted from the power supply 12 to peripheral component 13 through the power cords 120, the circuit board 112 and the connectors 113.

Figure 5:
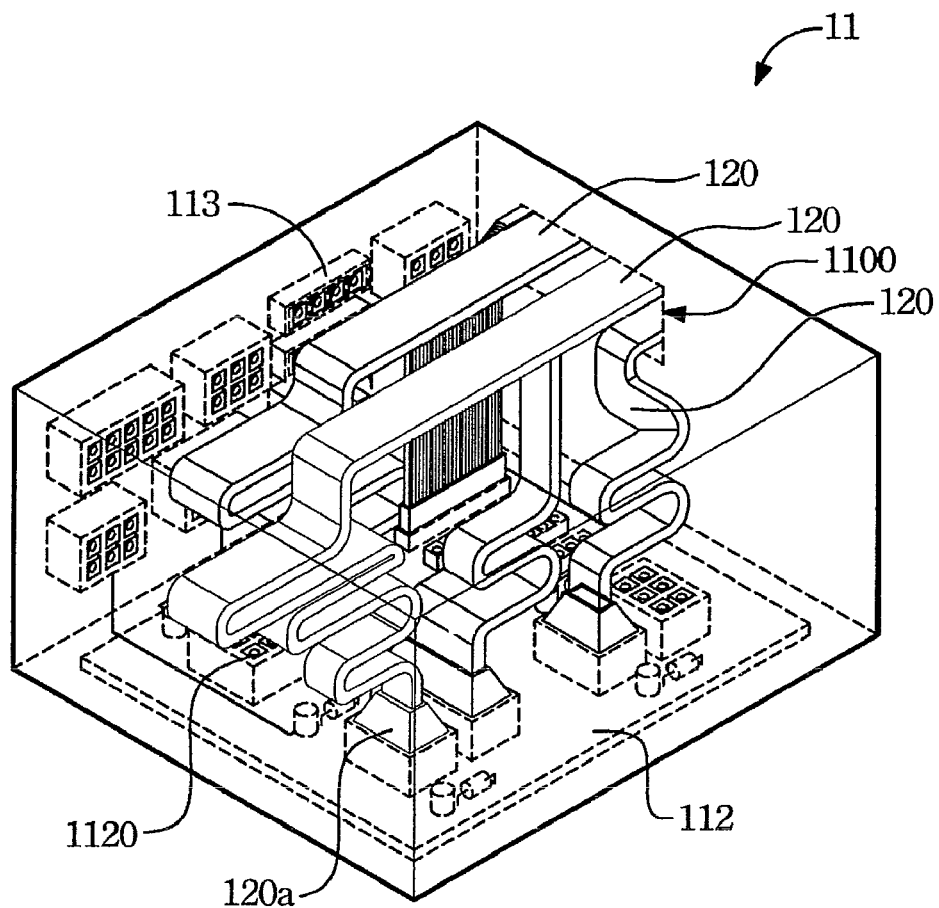
FIG. 5 is a schematic perspective view illustrating connection between the power cords and the cable box of the present invention.

FIG. 5 is a schematic perspective view illustrating connection between the power cords and the cable box of the present invention. As shown in FIG. 5, the power cords 120 are introduced into the inner portion of the box body 11 through the opening 1100 and then connected with the circuit board 112. Generally, after the power cords 120 are introduced into the inner portion of the box body 11 through the opening 1100, the cable connectors 120a at the front ends of the power cords 120 are inserted into corresponding insertion slots 1120 on the circuit board 112 according to the types of the power cords 120. As such, the power supply 12 will be electrically connected with the circuit board 112 via the cable box 11.

Moreover, since only one circuit board 112 is mounted within the cable box 11, the cable box 11 has additional space for accommodating the power cords 120. That is, the power cords 120 extended from the power supply 12 to the cable box 11 are exposed outside the cable box 11. Whereas, the remaining power cords 120 or unused power cords 120 may be collected and stored within the cable box 11 so as to achieve the purpose of storing and arranging the power cords 120 of the power supply 12.

Figure 6:
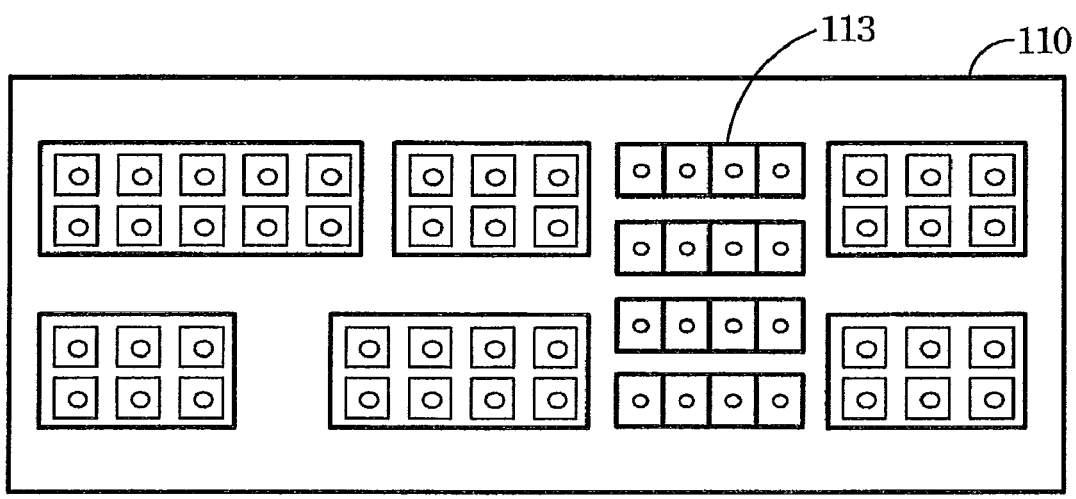
FIG. 6 is a schematic side view illustrating the connectors mounted on the sidewall of the cable box according to the present invention.

FIG. 6 is a schematic side view illustrating the connectors mounted on the sidewall of the cable box according to the present invention. The connectors 113 are electrically connected to corresponding peripheral components 13 through conducting wires. According to the peripheral components 13, the connectors 113 are selected from ATA, SATA, SCSI or SAS connectors. That is, after the cable connectors at both end of the conducting wire 123 (as shown in FIG. 3) are respectively connected to the desired connector 113 and the peripheral component 13, electrically is transmitted to the peripheral components 13 through the cable box 11.

In comparison with the prior art, the cable box of the present invention is more advantageous. For example, since the cable box of the present invention is installed in the floppy disk drive slot, no additional space is required to store the cable box. Under this circumstance, the space utilization in the computer case is enhanced. Moreover, since the remaining power cords or unused power cords are collected and stored within the cable box, the problem of causing messy and disorganized cable arrangement encountered from the prior art will be overcome. Under this circumstance, the possibility of hindering the fan within the computer case by the messy cables is minimized and thus the heat-dissipating efficiency of the fan is enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cable box of a computer, the computer comprising a power supply and a peripheral component, the cable box installed in the computer comprising:
    a box body having an opening, wherein a power cord of the power supply is introduced into the inner portion of the box body through the opening;
    a circuit board disposed within the box body and electrically connected with the power cord; and
    a plurality of connectors disposed on a sidewall of the box body and electrically connected to the circuit board through corresponding a plurality of conducting wires, wherein electricity is transmitted from the power supply to the peripheral component through one of the connectors.

2. The cable box according to claim 1 wherein an insertion slot is mounted on the circuit board and a cable connector at a front end of the power cord is inserted into the insertion slot.

3. The cable box according to claim 1 wherein a disk drive slot is further disposed within a computer case of the computer such that the cable box is installed in the disk drive slot.

4. The cable box according to claim 1 wherein the peripheral component is a hard disk, an optical disk drive or a disk burner.

5. The cable box according to claim 1 wherein a capacitor and an inductor are further mounted on the circuit board.

6. The cable box according to claim 1 wherein the opening of the box body is disposed in another sidewall of the box body.

7. A computer comprising:
    a computer case having a first disk drive slot and a second disk drive slot within the inner portion thereof;
    a motherboard;
    a cable box installed in the first disk drive slot;
    a power supply connected with the cable box through a power cord; and
    a peripheral component installed in the second disk drive slot, wherein electricity is transmitted from the power supply to the peripheral component through the cable box;
    wherein the cable box comprises:
    a box body having an opening, wherein the power cord of the power supply is introduced into the inner portion of the box body through the opening;
    a circuit board disposed within the box body and electrically connected with the power cord; and
    a plurality of connectors disposed on a sidewall of the box body and electrically connected to the circuit board through corresponding a plurality of conducting wires, wherein electricity is transmitted from the power supply to the peripheral component through one of the connectors.

8. The computer according to claim 7 wherein the insertion slot is mounted on the circuit board and a cable connector at a front end of the power cord is inserted into the insertion slot.

9. The computer according to claim 7 wherein the peripheral component installed in the second disk drive slot is a hard disk, an optical disk drive or a disk burner.

10. The computer according to claim 7 wherein a capacitor and an inductor are further mounted on the circuit board.

11. The computer according to claim 7 wherein the opening of the box body is disposed in another sidewall of the box body.

\* \* \* \* \*